United States Patent
Reudink

(10) Patent No.: US 6,512,480 B1
(45) Date of Patent: Jan. 28, 2003

(54) SYSTEM AND METHOD FOR NARROW BEAM ANTENNA DIVERSITY IN AN RF DATA TRANSMISSION SYSTEM

(75) Inventor: Mark D. Reudink, Seattle, WA (US)

(73) Assignee: Vectrad Networks Corp., Bothell, WA (US)

( * ) Notice: Subject to any disclaimer, the term of this patent is extended or adjusted under 35 U.S.C. 154(b) by 0 days.

(21) Appl. No.: 09/933,578

(22) Filed: Aug. 20, 2001

(51) Int. Cl.[7] .............................................. H01Q 21/06
(52) U.S. Cl. ...................................... 342/361; 342/374
(58) Field of Search ................................ 342/361, 374, 342/375, 58, 173; 455/277.1, 277.2

(56) References Cited

U.S. PATENT DOCUMENTS

| | | | |
|---|---|---|---|
| 5,625,881 A | * 4/1997 | Sandler et al. ............. | 455/38.3 |
| 5,757,318 A | * 5/1998 | Reudink ..................... | 342/374 |
| 6,005,516 A | * 12/1999 | Reudink et al. ............ | 342/375 |
| 6,212,406 B1 | * 4/2001 | Keskitalo et al. ........... | 455/562 |

FOREIGN PATENT DOCUMENTS

| | | | |
|---|---|---|---|
| WO | WO 99/55012 | * 10/1999 | ........... H04B/7/185 |

* cited by examiner

Primary Examiner—Dao Phan
(74) Attorney, Agent, or Firm—Fulbright & Jaworski L.L.P.

(57) ABSTRACT

A system and method providing narrow antenna beam polarity and/or angular diversity for subscriber stations in a point-to-multipoint RF data transmission system employs a subscriber multibeam antenna. Coangular pairs of antenna beams have orthogonal polarity and each pair is angularly diverse. The subscriber transceiver uses a plurality of inputs and at least one output. Polarization diversity for a subscriber is provided by employing one of the coangular pairs of antenna beams to receive corresponding polarization diverse signals from a hub. Angular diversity is provided by receiving transmissions on two angularly diverse beams from two hubs. At a hub the bit error rate of transmissions from a subscriber and/or signal levels of available frequencies with different polarizations are monitored and the optimal beam, frequency and polarization for transmissions from the subscriber are determined. Changes in frequency, beam or polarization for transmissions to the hub are communicated to the subscriber.

31 Claims, 2 Drawing Sheets

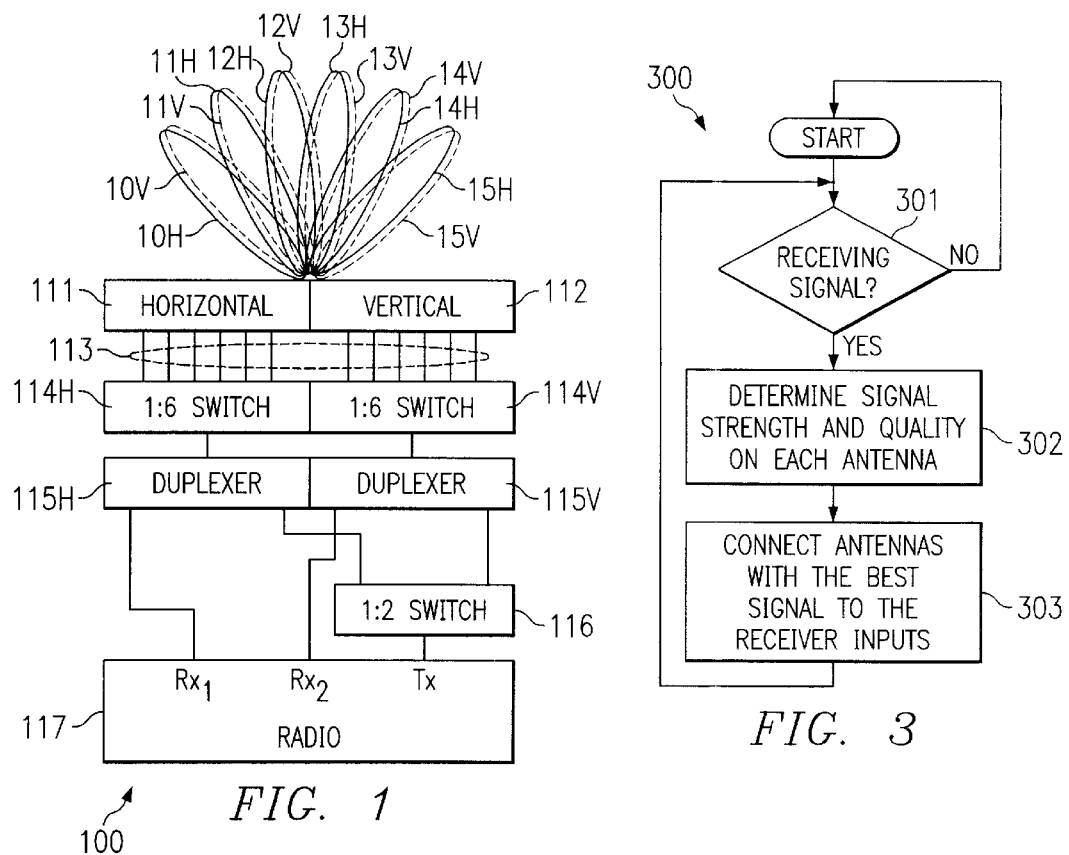
FIG. 1
FIG. 3
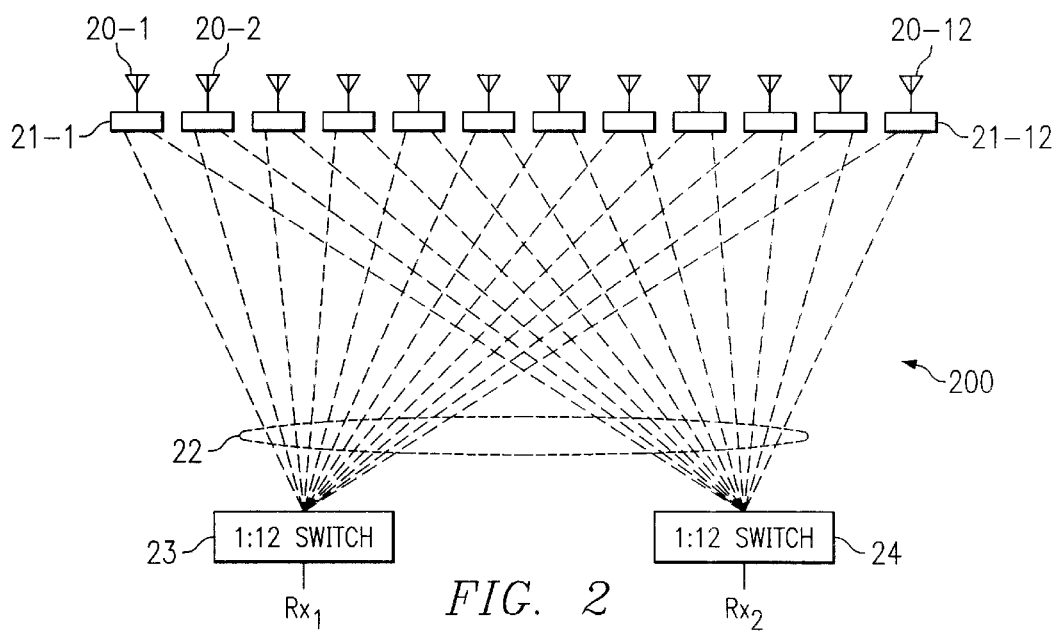
FIG. 2

SYSTEM AND METHOD FOR NARROW BEAM ANTENNA DIVERSITY IN AN RF DATA TRANSMISSION SYSTEM

TECHNICAL FIELD

The present invention generally relates to communications interference detection and mitigation systems and specifically to a narrow beam antenna diversity system and method for an RF data transmission system.

BACKGROUND

Currently, there are several so-called "last mile" and "last foot" data transmission systems which are designed to deliver high speed and/or high data capacity from the internet backbone to the end user. Several such systems use RF transmissions to replace copper wire or fiber optic cables. Some of these systems are called point to point or point to multipoint systems and operate in various licensed and unlicensed RF bands. A fundamental characteristic of most existing systems is that their RF transmissions occur in a frequency spectrum protected and regulated by a government body. These protected frequency spectrums, or bands, are licensed to certain license holders and only a few may operate in any given physical area depending upon the number of licenses available.

There are only a limited number of licensed bands in any geographic area, thus, in order to widen the choices consumers have, it is desirable for service providers to be able to use unlicensed RF bands to provide a capability to deliver high speed, high capacity data services. In addition, a service provider may not hold licenses in every geographic area that it desires to provide service. Therefore, use of unlicensed frequency bands may allow a service provider coverage or a greater geographical area.

In 1997 the FCC created a wireless arena called Unlicensed National Information Infrastructure (U-NII). System operators are free to operate wireless equipment in three sub-bands (5.15 to 5.25 GHz, 5.25 to 5.35 GHz and 5.725 to 5.825 GHz) without acquiring a licensed frequency spectrum. The FCC specifies the conditions and rules for operating wireless equipment in the U-NII frequency band. However, operators are not protected from possible interference from other U-NII operators transmitting in the vicinity or even other type of systems which utilize the same frequencies.

The IEEE, a standards group, is defining a wireless LAN standard, referred to as IEEE 802.11a for operation in the U-NII band. Equipment that conforms to this standard will operate indoors at the lower and middle frequency sub-band i.e. 5.15 to 5.25 GHz and 5.25 to 5.35 GHz. The ETSI BRAN group in Europe has defined an air interface standard for high-speed wireless LAN equipment that may operate in the U-NII frequency band. Equipment that is compatible with this standard may cause interference with use of the U-NII bands.

Prior art wireless communication systems that operate in non-line-of-sight environments benefit from multiple receive paths. If the signal paths are not correlated and the signal level on one path drops due to destructive combining of multiple signals, the signal level on the other path may not be experiencing the same fading. There are several prior art methods to reduce correlation between signal paths, the most common is spatial separation of antennas. Usually the antennas need to be separated by at least 10 wavelengths in order to be effective, which is impractical in many applications, such as cellular phone handsets. However, in cellular system base stations, antennas can be spatially separated to provide spatial diversity to mitigate the effects of fading. Other diversity techniques include angular diversity, polarization diversity or a combination of both. When angular and polarization diversity are employed, a spatial separation requirement for diversity may be eliminated.

In prior art fixed wireless data transmission systems, diversity inputs are generally not employed for subscriber stations. Diversity inputs may only be employed at the base station or hub, if used at all. Problematically, fixed wireless systems generally use directional antennas, which requires the antenna to be relatively large in order to obtain a directional beam. In order to avoid doubling the width of the antenna, the two diversity paths can be vertically separated.

In a fixed point to multipoint wireless data transmission system problematic variations arise in the path between a hub and a subscriber resulting in signal fading and multipath effects. For example, the movement of trees and traffic or buildings swaying result in significant signal fading and multipath effects. Additionally, data traffic in a network, such as a LAN, WAN, Intranet or the Internet, tends to be asymmetrical. Generally, more data is transmitted to a subscriber than from a subscriber to the network backbone. Therefore, in a wireless RF data transmission environment, it is desirable to provide a stable broadband link from the data transmission hub of such a system to a subscriber. In the reverse direction from a subscriber station to a hub, it is desirable to provide a stable link as well. Hence, it is desirable to provide a subscriber system which can receive employing antenna diversity, and to direct a subscriber to transmit to a hub using a most advantageous single antenna beam since the base station may also employ receive diversity.

SUMMARY OF THE INVENTION

The present system and method provides narrow antenna beam polarity, angular and/or spatial diversity for subscriber stations in a point to multipoint RF data transmission system. At the subscriber station the system comprises a multibeam antenna generating a plurality of antenna beams. Coangular pairs of the antenna beams comprise two beams having orthogonal polarity. Both horizontal and vertical polarizations, or two other orthogonal polarizations, may be utilized at the subscriber antenna. Each of the pairs are angularly diverse from other pairs. The subscriber transceiver has a plurality of receiver inputs and at least one transmitter output, generally, two inputs and one output. At the hub the bit error rate of transmissions from a subscriber and/or signal levels of available frequencies and polarizations are monitored and the optimal beam, frequency and polarization for transmissions from the subscriber are determined. Any changes in frequency, beam or polarization is communicated to the subscriber unit to initiate a change.

Polarization diversity for reception of transmissions from a single hub is preferably implemented by the subscriber unit employing one of the coangular pairs of antenna beams for reception. The hub transmits to the subscriber unit employing a corresponding pair of antenna beams with frequencies and polarizations matching the coangular pair of subscriber antenna receiving beams. Alternatively, as described below with reference to the embodiment of FIG. 2, angular diversity may be provided to a subscriber by transmitting to the subscriber from two separate hubs using angularly diverse antenna beams which correspond to angularly diverse receive beams used by the subscriber station. These beams may or may not have polarization diversity as well.

When a single transmitting antenna is used at a base station the transmission environment may change the characteristics of the transmitted signal. Obstructions, conditions and variations in the transmission path between a single base station and a subscriber station may result in signals arriving from multiple angles at the subscriber station. Therefore, the subscriber station may advantageously employ angular diversity. Similar environmental conditions may cause signals to arrive at a subscriber station with a variation in polarization which may be best received using a polarization orthogonal to the polarization of the original transmission.

One of the advantages of a fixed wireless system is a larger antenna footprint than normally exist in the mobile environment. This allows use of multiple antennas and antenna beams at a subscriber station, as well as the hub. Using horizontally spatially separated, narrow beam antennas is impractical at a subscriber station because of the associated physical antenna width. However, it is advantageous to use a narrow antenna beam with either a different polarization, than the primary subscriber antenna beam, or to use a different azimuth than the primary antenna beam. Such polarization diversity and angular diversity is practical with a small form factor antenna. This will provide two or more inputs to the subscriber receiver and hence diversity. Alternatively, a second antenna, physically spaced a small vertical distance from a first antenna, but covering the same space between the hub and the subscriber station can also provide diversity.

At the subscriber station of one embodiment of the system there is a multibeam antenna generating a plurality of antenna beams. Coangular pairs of the antenna beams comprise two beams having orthogonal polarity. Each of the pairs are angularly diverse from other pairs. By way of example, if there are 120 degrees of coverage by a subscriber antenna, this coverage can be provided by 12 radiation patterns. A single radiation beam pattern is, in this example, 20 degrees wide with a horizontal polarization. An additional 20 degree, coangular beam pattern with a vertical polarization is available. Therefore, in this example, there would be six antenna beams in azimuth with two different polarizations, thereby providing 12 radiation patterns. The subscriber unit has a plurality of receiver inputs and at least one transmitter output to utilize the available beams. In this manner, diverse paths into the subscriber receiver unit are provided. Alternatively, vertically spatially separated antennas may be utilized to provide 24 radiation patterns.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 is a diagramatical representation of the present diversity system for RF data communication using narrow beam antennas;

FIG. 2 is an alternative embodiment of the system providing greater diversity;

FIG. 3 is a flow chart illustrating selection by a subscriber station of the optimal antenna beam.

DETAILED DESCRIPTION

Figure 4:
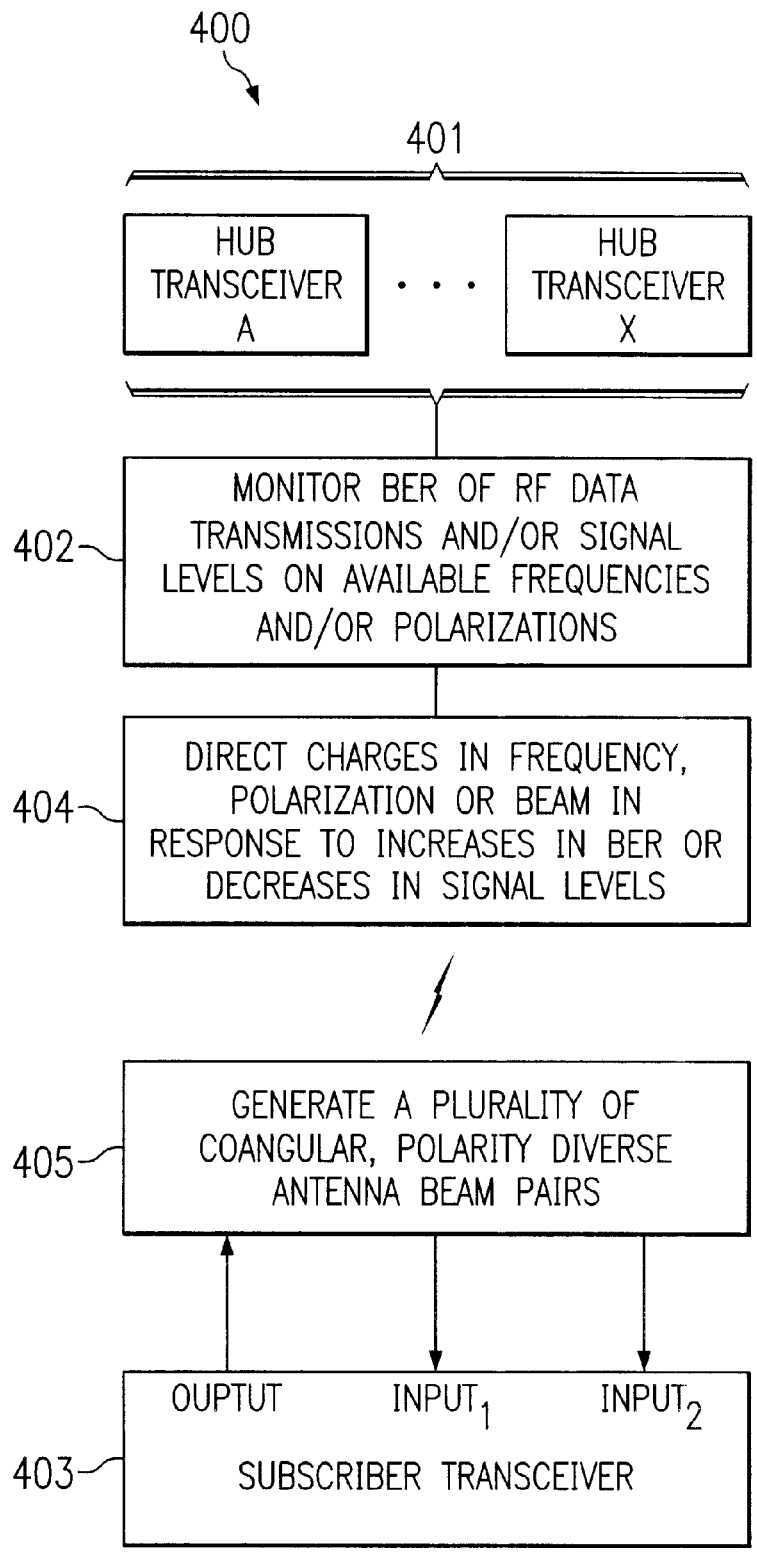
FIG. 4 is a diagrammatic representation of operation of the present system and method.

Turning now to FIG. 1, subscriber system 100 of the illustrated embodiment employs horizontally and vertically polarized angularly diverse antenna beams provided by a multibeam antenna array, such as a Butler matrix antenna array. In the present system there are multiple antenna beams, for example, 10H, 10V, 11H, 11V, 12H, 12V, 13H, 13V, 14H, 14V, 15H and 15V, shown in FIG. 1, by way of example, to be 20 degrees wide. There are six illustrated beams covering a 120 degree area in each polarization. Switches 114H and 114V and connection network 113 provide inputs into the radio unit 117. Subscriber radio unit 117 advantageously uses two diversity inputs, RX1 and RX2. The present system provides these inputs with signals via horizontal and vertical antenna elements 111 and 112, respectively. A polarization diverse antenna beam pair, for example 10H and 10V, may be fed into RX1 and RX2 through switches 114H and 114V. Although signals from antenna beams with different polarizations are being provided to subscriber radio 117, the beams have the same azimuth. Alternatively, antenna beams pointing in different directions, angularly diverse antenna beams with different polarizations, for example, 10V and 11H, may be fed into inputs RX1 and RX2. For purposes of illustration and explanation vertical and horizontal polarizations are depicted in the drawings and discussed herein. However, as will be appreciated by one skilled in the art, other polarizations may be employed by the present invention, including but not limited to slant right, slant left, right circular and left circular polarizations.

The purpose of using multiple inputs into subscriber radio 117 is a likelihood that during reception a signal on a certain polarization on an antenna beam, for example 10H, may be experiencing a deep fade or interference, while a duplicate signal on an alternate polarization, for example 10V, will not. Transmitting from a hub to subscriber system 100 using two diverse polarizations and receiving these two different polarizations allows subscriber radio 117 to select between the polarization that has the highest signal level and/or the most suitable signal attributes at any particular time. Also, if the hub is transmitting on a single polarization to a subscriber station, the polarization may rotate due to scattering. Under such circumstances receiving on a second polarization may provide desired signal diversity. This allows the through-put of the system to be maintained at a higher level than would be possible with just a single input experiencing fades, polarization rotation or other effects due to interference. As detailed below, a single polarization on a single beam is preferably used for transmission.

Preferably, the direction of beams 10H and 10V is fixed and directed toward a particular hub or hubs. The reasons for using angularly diverse beams 10H through 15H and 10V through 15V include allowing reception from multiple hubs at any particular instant in time. Also, angularly diverse receive beams enable a subscriber station to locate the optimal hub during the installation process. Finally, angularly diverse receive beams allow switching to a different hub if a first hub is experiencing particularly heavy traffic or if interference conditions dictate such a switch.

Subscriber transmissions will preferably not take place through multiple beams, maintaining a simplified transmission structure, while subscriber reception preferably takes place through multiple beams. Additionally, as the base station is preferably employing a receive diversity system, it may not be necessary for a subscriber station to transmit on multiple beams. In subscriber system 100, a single transmitting antenna beam is preferably utilized, and transmitter Tx of Radio 117 is fed through a 1:2 splitter 116, so that either a horizontally or vertically polarized transmission can take place. Duplexer 115H or 115V isolates the transmit and receive signals. In a timed duplex system, where the same frequencies are used to transmit and receive, but at different times, the duplexers may be replaced with a timing system, for example. Subscriber radio 117 transmits out on a selected beam, either horizontally or vertically polarized, but preferably in only one polarization. Switch 116 directs a transmitted signal from subscriber radio 117 to either duplexer 115H or duplexer 115V, depending on which polarization is optimal for transmission to the hub as determined by the hub and communicated to the subscriber station as described below.

Alternatively, transmission may be carried out by a subscriber station on both coangular antenna beams, for example 10H and 10V, simultaneously and let the hub determine which path is optimal. It may be desirable to do this if there is, by way of example, fading on one polarity. The hub may also employ diversity receivers. Therefore, if a single antenna beam is used to transmit to the hub and the polarization were to rotate due to scattering between the subscriber and the hub, the hub can compensate for this rotation. However, using multiple transmitters or transmission beam at subscriber unit 100 requires a higher powered amplifier to transmit two signals simultaneously. Using multiple transmitters at subscriber station may also cause more internal interference in the network than if subscriber to hub transmissions were made using a single antenna beam.

FIG. 2 shows alternative embodiment 200 of the present subscriber system. In FIG. 2, antennas 20-1 through 20-12 are shown. These antennas can have similar coverage to those shown in FIG. 1, where, by way of example, 20-1 could be a 20 degree antenna having a horizontal polarization pointed in the same direction as shown in FIG. 1 for 10H. Subscriber system 200 allows expanded capability using connections 22 between antennas 20-1 through 20-12 and receiver inputs RX1 and RX2. FIG. 2 shows only two receiver inputs RX1 and RX2, but more than two receiver inputs could be utilized. Since, as illustrated, subscriber system 200 has two receiver inputs, two-way splitters 21-1 through 21-12 are deployed between the antenna elements and the receiver inputs. An expanded subscriber system having more receiver inputs would preferably employ corresponding multiway splitters. Subscriber system 200 has increased flexibility due to an ability to connect any set of antennas to a receive path via twelve-way switches 23 and 24. In subscriber system 200, antennas oriented in the same direction can be directed to two different receiver inputs. Alternatively, antennas with the same polarization, but different angles, can be directed to the receiver inputs. This allows transmissions from a single hub on different polarizations or beams to be received on the two collocated subscriber receivers. Also, transmissions from multiple hubs, that might be in different locations, may be received simultaneously by such multiple collocated subscriber receivers. This facilitates flexibility and ability to decorrelate signals, which is a benefit for mitigation of deep fades or interference that may not occur simultaneously on two different receive paths from different hubs.

With attention directed to FIG. 3, process 300 for determining the subscriber antenna to be used to receive signals from a hub is outlined. If the subscriber system is receiving a signal at 301, a determination is made at box 302 of the strength and quality of signals received on each antenna using criteria such as bit error rate (BER), modulation level, signal strength or the like. Then the coangular, polarization diverse antenna beam pair with the best signal attributes is preferably connected to the inputs of the subscriber receiver, box 303 until the signal is lost or a better beam is found. Once a signal is lost or alternatively if the signal falls below a predetermined threshold, the process, steps 301–303, is restarted once a signal is again acquired at box 301. Periodically, the available beams and polarizations may be monitored or tested at box 302 to determine if a better receiver beam or beam pair is available.

Turning to FIG. 4, a method 400 of practicing the present invention is diagrammatically illustrated. Preferably, the optimal subscriber transmission frequency and polarization to one or more hubs 401 is determined at each hub. Therefore, the subscriber unit should not change the transmission polarity based upon an instantaneous change in signal level between the antenna beams at the subscriber station; it should change polarity based upon directions from a hub. The optimal subscriber transmission polarity may or may not be the same polarity as the optimal subscriber receive polarity. At box 402, the optimal subscriber transmission frequency and polarization may be determined by detecting a BER of subscriber transmissions to the hub or a similar quality measure. Also, signal levels or other quanitive measurements at the hub on the different polarizations and/or frequencies may be used to determine an optimal subscriber transmission frequency and polarity at box 402. Signal levels are preferably determined by performing rapid off channel measurements (ROCM) of received signal strength indicators (RSSI). The optimal frequency and polarization may change over time. Therefore, the optimal polarization and frequency is determined at box 402, periodically employing ROCM or when a quality threshold is breached, and any polarity or beam change is fed back from the hub to subscriber transceiver unit 403, at box 404.

The subscriber station 404 employs a multibeam antenna to generate a plurality of antenna beams, box 405. As described above, coangular pairs of the antenna beams comprise two beams having orthogonal polarity. Each of the pairs are angularly diverse from other pairs. The subscriber transceiver has a plurality of receiver inputs and at least one transmitter output, generally two inputs and one output.

Preferably, the best subscriber transmit antenna beam is determined by the hub unit as well. If a hub experiences a high BER, or an increase in the BER coming from a particular subscriber on a beam at box 402, the hub will request, that the subscriber unit 403 change the transmissions to the hub to a different beam and/or polarity at box 404.

Consistent with the above description polarity diversity at subscriber 403 for transmissions from a single hub 401 is preferably implemented by employing one of the coangular pairs of antenna beams generated at box 405 for reception of two polarity diverse identical transmissions from hub 401. Angular diversity is preferably provided to subscriber receiver 403 by receiving identical transmissions from two separate hubs 401 using angularly diverse antenna beams generated at box 405. These angularly diverse beams may or may not have polarity diversity as well.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing antenna diversity for an RF data transmission system, said method comprising the steps of:

monitoring frequencies, having a plurality of polarizations, used for RF data transmissions for optimal conditions for said RF data transmissions from a subscriber station transmitter; and directing, in response to said conditions, said subscriber station transmitter to change a polarization of said transmissions.

2. The method of claim 1 further comprising the steps of:

generating a plurality of antenna beams for use by said subscriber station transmitter and a subscriber station receiver, coangular pairs of said antenna beams comprising two beams having orthogonal polarity, each of said pairs being angularly diverse from others of said pairs;

receiving RF data transmissions using a plurality of said antenna beams;

routing signals received on said plurality of antenna beams to a plurality of subscriber receiver inputs; and transmitting using said subscriber transmitter and at least one of said antenna beams and from at least one transmitter output.

3. The method of claim 1 wherein said monitoring step includes monitoring a bit error rate of transmissions from said subscriber transmitter and said directing step is carried out in response to an increase in said bit error rate.

4. The system of claim 1 wherein said monitoring step includes monitoring a signal level of transmissions on said frequencies.

5. The method of claim 2 wherein said directing step includes the step of:

selecting at least one of said beams for data transmissions to and from said subscriber transmitter.

6. The method of claim 2 wherein said monitoring step is carried out by at least one hub receiver, said hub receiver receiving data transmissions from said subscriber transmitter.

7. The method of claim 6 wherein said subscriber receiver receives transmissions from at least one hub transmitter on a plurality of said antenna beams.

8. The method of claim 6 wherein said subscriber receiver receives transmissions from said hub transmitter on one of said coangular pairs of said antenna beams.

9. The method of claim 7 wherein said antenna beams are angularly diverse.

10. The method of claim 9 wherein said transmissions from said at least one hub transmitter originate from separate ones of said hub transmitters.

11. The method of claim 5 wherein said selecting step includes selecting a frequency and one of said coangular pairs of antenna beams.

12. A diversity system for RF data transmissions, said system comprising:

a multibeam antenna generating a first plurality of antenna beams, pairs of said first antenna beams having orthogonal polarization, each of said pairs being angularly diverse from others of said pairs;

a first receiver having a plurality of inputs receiving signals from at least two of said antenna beams;

a first transmitter having at least one output transmitting signals over at least one of said antenna beams;

means for monitoring RF data transmission frequencies, having a plurality of polarizations, for optimal conditions for said RF data transmissions; and means, responsive to said conditions, for selecting at least one of said beams having one of said orthogonal polarizations for data transmissions from said first transmitter.

13. The diversity system of claim 12 wherein said first receiver is a subscriber receiver and said first transmitter is a subscriber transmitter.

14. The diversity system of claim 12 wherein said pairs of antenna beams comprise two coangular antenna beams.

15. The system of claim 12 wherein said means for monitoring monitors a bit error rate of transmissions from said first transmitter and said means for selecting is responsive to said bit error rate.

16. The system of claim 12 wherein said means for monitoring monitors a signal level of transmissions on said frequencies and polarizations.

17. The system of claim 12 wherein said means for monitoring is collocated with at least one other receiver receiving from said first transmitter and collocated with at least one other transmitter transmitting to said first receiver.

18. The system of claim 17 wherein said at least one other transmitter transmits data to said first receiver on a second plurality of antenna beams for reception by said first receiver over said at least two antenna beams.

19. The system of claim 18 wherein said first receiver receives said data transmissions from said other transmitter on one of said pairs of first antenna beams.

20. The system of claim 18 wherein said first receiver receives data transmissions angularly diverse ones of said first antenna beams.

21. The system of claim 20 wherein said transmissions received on said angularly diverse antenna beams originate from separate ones of said other transmitters.

22. The system of claim 12 wherein said means for selecting selects a frequency and one of said pairs of antenna beams.

23. The system of claim 17 wherein said means for selecting is collocated with said at least one other transmitter and said at least one other receiver.

24. A narrow antenna beam diversity system for RF data transmissions, said system comprising:
- at least one subscriber station comprising:
  - a multibeam antenna generating a plurality of antenna beams, coangular pairs of said antenna beams comprising two beams having orthogonal polarity, each of said pairs being angularly diverse from others of said pairs;
  - a subscriber receiver, having a plurality of inputs receiving signals from a plurality of said antenna beams
  - a subscriber transmitter having at least one output transmitting signals over at least one of said antenna beams;
- at least one hub base station comprising:
  - at least one hub receiver receiving said transmitted signals from said subscriber transmitter
  - at least one hub transmitter transmitting to said subscriber receiver for reception on a plurality of said antenna beams;
  - means for monitoring a plurality of frequencies, having a plurality of polarizations, used for RF data transmissions for optimal conditions for said RF data transmissions; and,
  - means, responsive to said conditions, for selecting at least one of said beams and polarizations for data transmissions to and from said subscriber transmitter.

25. The system of claim 24 wherein said means for selecting selects at least one of said frequencies for data transmissions from said subscriber transmitter.

26. The system of claim 24 wherein said means for monitoring monitors a bit error rate of transmissions from said subscriber receiver and said means for selecting is responsive to said bit error rate.

27. The system of claim 24 wherein said means for monitoring monitors a signal level of transmissions on said frequencies.

28. The system of claim 24 wherein said subscriber receiver receives transmissions from said at least one hub transmitter on one of said pairs of said antenna beams.

29. The system of claim 24 wherein said subscriber receiver receives transmissions from said at least one hub transmitter on angularly diverse of said antenna beams.

30. The system of claim 29 wherein a plurality of said hub transmitters transmit to said subscriber transceiver for reception on said angularly diverse antenna beams.

31. The system of claim 24 wherein said means for selecting selects one of said coangular pairs of antenna beams for receiving transmissions to said subscriber receiver.

* * * * *